(12) United States Patent
Sartori et al.

(10) Patent No.: US 10,057,076 B2
(45) Date of Patent: Aug. 21, 2018

(54) SYSTEM AND METHOD FOR DEVICE-TO-DEVICE COMMUNICATION

(71) Applicant: Futurewei Technologies, Inc., Plano, TX (US)

(72) Inventors: Philippe Sartori, Plainfield, IL (US); Hossein Bagheri, Urbana, IL (US); Vipul Desai, Palatine, IL (US); Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 306 days.

(21) Appl. No.: 14/712,440

(22) Filed: May 14, 2015

(65) Prior Publication Data
US 2015/0334760 A1 Nov. 19, 2015

Related U.S. Application Data

(60) Provisional application No. 62/000,394, filed on May 19, 2014.

(51) Int. Cl.
*H04W 72/02* (2009.01)
*H04L 12/26* (2006.01)
*H04W 76/02* (2009.01)
*H04W 72/08* (2009.01)
*H04L 12/911* (2013.01)
(Continued)

(52) U.S. Cl.
CPC .......... *H04L 12/26* (2013.01); *H04L 12/6418* (2013.01); *H04L 43/08* (2013.01); *H04L 47/822* (2013.01); *H04W 72/02* (2013.01); *H04W 72/085* (2013.01); *H04W 76/02* (2013.01); *H04W 76/023* (2013.01); *H04W 76/10* (2018.02); *H04W 76/14* (2018.02); *H04W 72/08* (2013.01)

(58) Field of Classification Search
CPC ....................................................... H04W 72/02
See application file for complete search history.

(56) References Cited

U.S. PATENT DOCUMENTS

2011/0106952 A1 5/2011 Doppler et al.
2011/0151887 A1 6/2011 Hakola et al.
(Continued)

FOREIGN PATENT DOCUMENTS

CN 101902822 A 12/2010
CN 102090132 A 6/2011
WO 2013181785 A1 12/2013

OTHER PUBLICATIONS

"RAN1 Chairman's Notes," 3GPP TSG RAN WG1 Meeting #76, Prague, Czech Republic, Feb. 10-14, 2014, 56 pgs.
(Continued)

*Primary Examiner* — Kent Krueger
(74) *Attorney, Agent, or Firm* — Slater Matsil, LLP

(57) ABSTRACT

A method for device-to-device (D2D) communication includes sensing D2D resources from a pool of resources for a predetermined duration to produce measurements of the D2D resources and determining statistics in accordance with the measurements of the D2D resources. The method also includes determining a first subset of the D2D resources in accordance with the statistics and transmitting, by a first user equipment (UE) to a second UE, data over the first subset of the D2D resources.

20 Claims, 7 Drawing Sheets

(51) Int. Cl.
 H04W 76/14 (2018.01)
 H04W 76/10 (2018.01)
 H04L 12/64 (2006.01)

(56) References Cited

U.S. PATENT DOCUMENTS

| 2014/0301228 | A1* | 10/2014 | Kwak | H04W 8/005 |
| | | | | 370/252 |
| 2015/0215903 | A1* | 7/2015 | Zhao | H04W 72/04 |
| | | | | 370/329 |
| 2016/0183276 | A1* | 6/2016 | Marinier | H04W 72/02 |
| | | | | 370/329 |

OTHER PUBLICATIONS

"RAN1 Chairman's Notes" 3GPP TSG RAN WG1 Meeting #76bis, Shenzhen, China, Mar. 31-Apr. 4, 2014, 49 pgs.
Qualcomm Incorporated., "Work item proposal on LTE Device to Device Proximity Services," 3GPP TSG RAN Meeting #63, RP-140518, Mar. 3-6, 2014, 7 pgs.

* cited by examiner

SYSTEM AND METHOD FOR DEVICE-TO-DEVICE COMMUNICATION

This application claims the benefit of U.S. Provisional Application Ser. No. 62/000,394 filed on May 19, 2014, and entitled "System and Method for Statistical Sensing for D2D Communication," which application is hereby incorporated herein by reference.

TECHNICAL FIELD

The present invention relates to a system and method for wireless communications, and, in particular, to a system and method for device-to-device communications.

BACKGROUND

Device-to-device (D2D) technology is expanding because of its ability to offer new services, improve system throughput, and offer a better user experience. D2D operations include discovery and communication. In one example of discovery, a user equipment (UE) attempts to discover neighboring UEs for D2D communications, either on its own or directed by a communications controller, including intra-cell and inter-cell deployments. In D2D communications, one UE directly communicates with another UE without the data transiting through the communications controller, including intra-cell and inter-cell deployments. D2D operations may be performed in-coverage, out-of-coverage, or partial coverage. D2D communications may include public safety uses and/or other uses.

SUMMARY

An embodiment method for device-to-device (D2D) communication includes sensing D2D resources from a pool of resources for a predetermined duration to produce measurements of the D2D resources and determining statistics in accordance with the measurements of the D2D resources. The method also includes determining a first subset of the D2D resources in accordance with the statistics and transmitting, by a first user equipment (UE) to a second UE, data over the first subset of the D2D resources.

An embodiment first user equipment (UE) includes a processor and a non-transitory computer readable storage medium storing programming for execution by the processor. The programming includes instructions to sense D2D resources from a pool of resources for a predetermined duration to produce measurements of the D2D resources and determine statistics in accordance with the measurements of the D2D resources. The programming also includes instructions to determine a subset of the D2D resources in accordance with the statistics and transmit, to a second UE, data over the subset of the D2D resources.

An embodiment computer program product includes a non-transitory computer readable storage medium storing programming for execution on a processor. The programming includes instructions for sensing D2D resources from a pool of resources for a predetermined duration to produce measurements of the D2D resources and determining statistics in accordance with the measurements of the D2D resources. The programming also includes instructions for determining a subset of the D2D resources in accordance with the statistics and transmitting, by a first user equipment (UE) to a second UE, data over the subset of the D2D resources.

The foregoing has outlined broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Two aspects of device-to-device (D2D) operations are discovery and communication. In one example of discovery, a user equipment (UE) attempts to discover neighboring UEs for D2D communications, either on its own or with direction from communications controller, such as an enhanced Node B (eNB). In one example of a D2D communication, one UE directly communicates with another UE without the data transiting through the communications controller. A D2D link is a direct connection between two UEs without a radio bearer, such as the data plane, for communications through the communications controller.

One issue in D2D communications is resource allocation. Resource allocation may be performed for UEs engaged in D2D communication, whether they are in-coverage, out-of-coverage, or partial coverage. D2D communications may be performed within a cell for intra-cell D2D deployment or between UEs in different cells for intra-cell D2D deployment.

Figure 1:
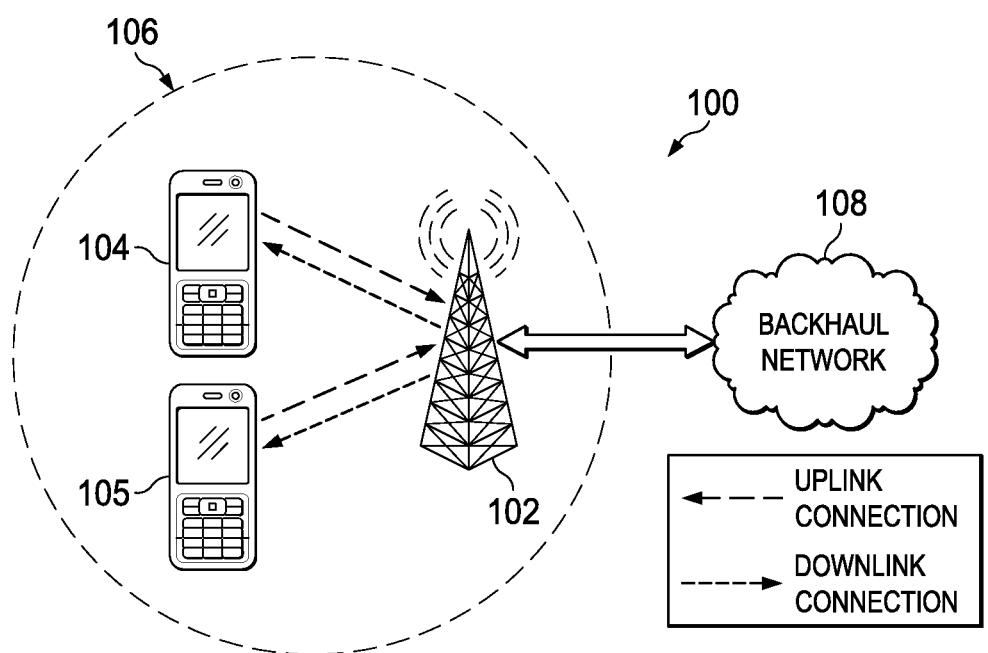
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by establishing uplink (dashed line) and/or downlink (dotted line) communications with UE 104 and UE 105, such as a base station, a NodeB, an eNB, an access point, a picocell, a femtocell, relay node, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc.

Figure 2:
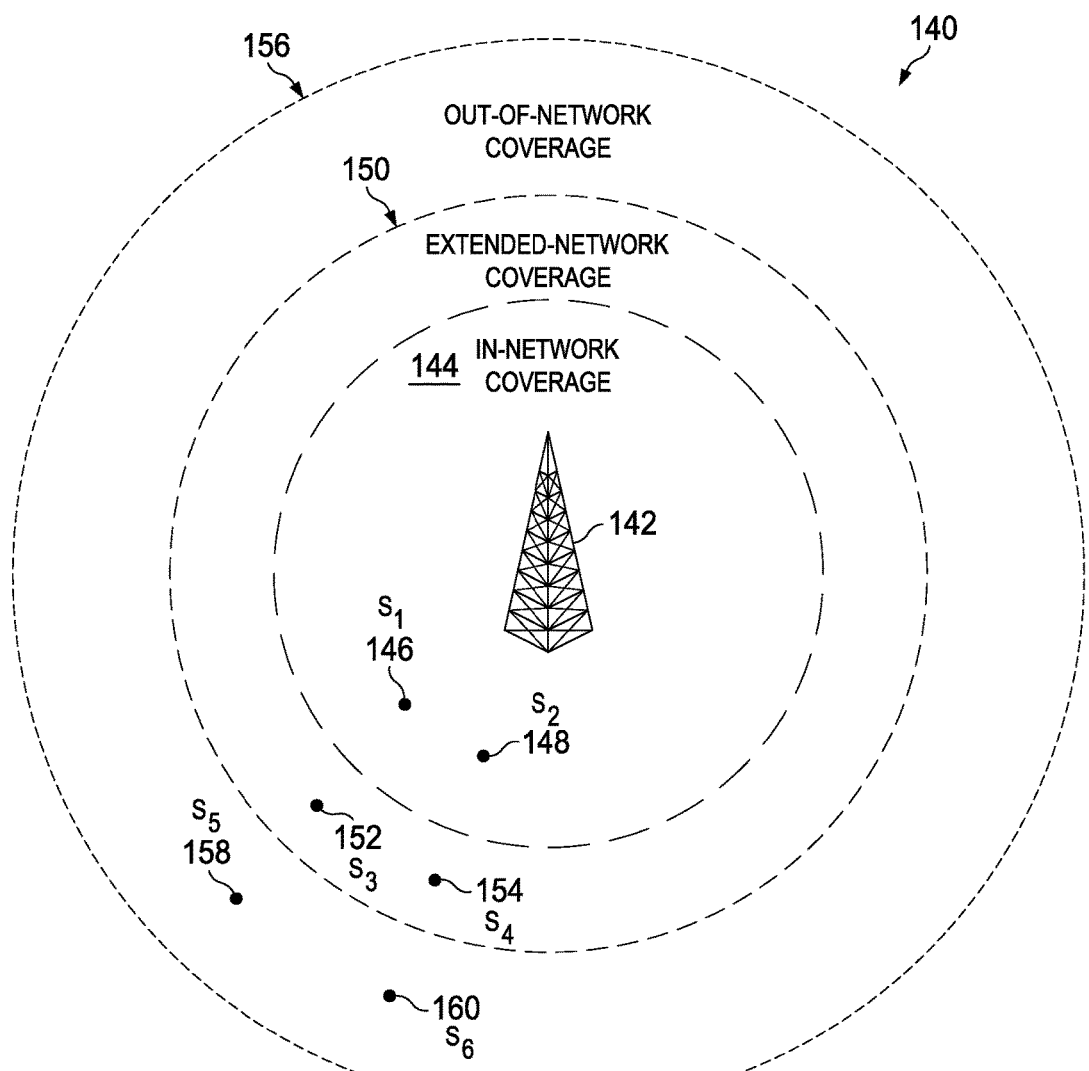
FIG. 2 illustrates wireless coverage levels.

The locations of UEs relative to the communications controller may affect the coverage. UEs may be in-coverage, out-of coverage, or partial coverage. FIG. 2 illustrates system 140 with communications controller 142. In in-network coverage area 144, UEs, such as UE 146 and UE 148, are able to establish communication links to transmit messages to communications controller 142 and receive messages from communications controller 142. In out-of-network coverage area 156, UEs, such as UE 158 and UE 160, cannot establish direct communication links to communicate with communications controller 142 at all. On the other hand, in area 150, also known as partial coverage area, extended coverage, or edge of network, UEs, such as UE 152 and UE 154 may be able to receive messages and/or signals from communications controller 142 but may not be able to transmit messages to communications controller 142. For example, UEs in partial coverage may observe some transmissions from the communications controller but may not be able to establish a communication link with the communications controller. In another partial coverage scenario, of two UEs performing D2D communication, one UE is located in-network coverage and the other UE is out-of-network coverage or has partial coverage. D2D communication may occur in in-network coverage, in extended-network coverage, or in out-of-network coverage.

Figure 3:
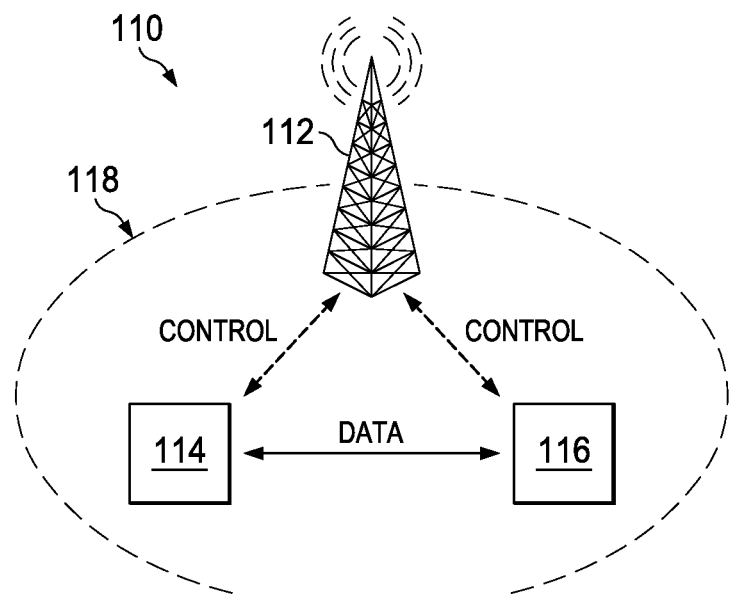
FIG. 3 illustrates network-centric device-to-device (D2D) connections.

Two modes of implementing D2D operations include network-centric (network-managed) D2D mode and device-centric D2D mode. FIG. 3 illustrates system 110 which comprises a network-centric D2D mode. In network-centric D2D mode, the network initiates a D2D connection between two or more devices when conditions are appropriate. Conditions which may be considered include local parameters, such as the proximity of the devices, and macro parameters, such as overall traffic demand, location of non-D2D devices and other conditions. The communications controller schedules the exact resources used by a UE to transmit direct data and direct control information (e.g., scheduling information for the data) between the UEs. The communications controller controls transmission power of scheduling assignments (SAs) and data, for example using downlink control information (DCI) and data using a physical downlink control channel (PDCCH) or an enhanced PDCCH (ePDCCH). The location of the resources for transmission of the scheduling assignment and data by the transmitting UE, which is the UE transmitting in D2D communication, comes from the communications controller. Network-centric D2D mode may enable local offloading. UE 114 and UE 116 are in coverage area 118 of communications controller 112. Control information passes between communications controller 112 and UEs 114 and 116 to set up D2D communication between UE 114 and UE 116. Then D2D communication is performed between UE 114 and UE 116, and the UEs directly exchange data.

With a network-managed approach, D2D operations complement and enhance the capabilities of the network, facilitating more efficient utilization of radio resources for proximate communications. The network may constantly supervise the usage of direct and infrastructure routing of data for efficient utilization of resources, reducing interference, and benefitting the network. Features which are inherent in the network may be extended to support D2D operations in a network-managed approach.

Figure 4:
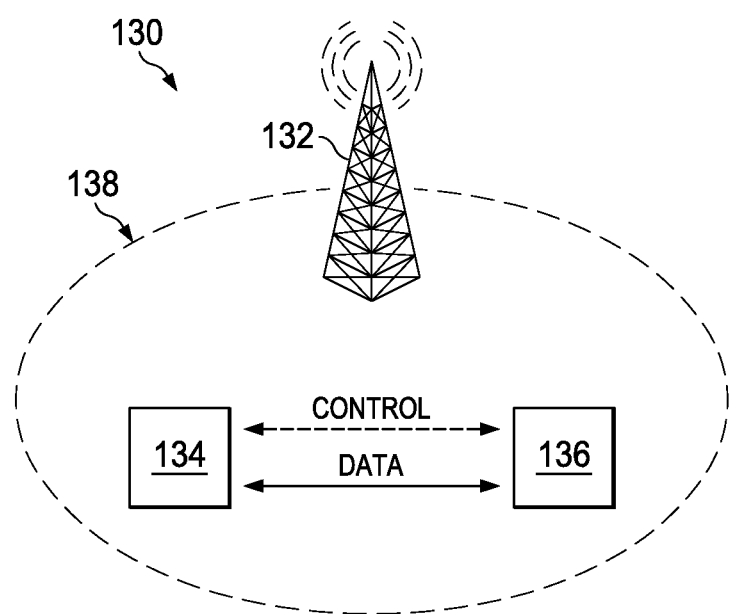
FIG. 4 illustrated device-centric D2D connections.

An example of device-centric D2D mode is illustrated by system 130 in FIG. 4. UEs 134 and 136 are in coverage area 138 of communications controller 132. In a device-centric or lifestyle mode, devices initiate D2D connections without network oversight. The UEs autonomously select resources to transmit from a pool of resources to transmit direct data and direct control information. The pool of resources may be preconfigured or configured by the network. The network may broadcast the configuration using higher layer signaling with parameters transmitted on the system broadcast. An example of higher layer signaling is radio resource control (RRC) signaling. In RRC signaling, the transmission of parameters by the communications controller to a specific UE may be used to configure that UE. The functionality to enable D2D operations resides almost entirely in the UEs, with minimal network involvement. In fact, direct communication between devices forms an overlay on top of the cellular network. UEs 134 and 136 directly coordinate control. Then, UEs 134 and 136 perform D2D communication.

In device-centric D2D mode, traditional functions of the cellular networks, such as resource allocation and management, are performed in an ad-hoc manner between the individual devices without network oversight or management. This may limit the potential performance gains from D2D operations, and introduce some challenges in supporting functions, such as ensuring the security of user data and protecting user identity/location from being discovered by unauthorized parties, enabling the network operator to charge for D2D and proximity operations as a service, supporting lawful interception for all potential communications between devices, and scalability for different deployment scenarios and densities of devices. A device-centric approach may be considered a type of contention access, where the devices attempting to transmit on a D2D link contend with each other for transmission resources. The receiving UEs are notified of the resources where they will receive D2D communications via a SA. The location of the resources for transmission of the scheduling assignment by the transmitting UE may come from the communications controller, or may be preconfigured, and the location of the resources for transmission of the D2D data by the transmitting UE comes from the communications between the UEs. In one operating mode, the transmitting UE initially transmits a scheduling assignment intended for the receiving UE. The contents of the scheduling assignment may indicate both the time and frequency resources that the transmitting UE will use for data communications.

In D2D communication, D2D transmissions may occur on the uplink (UL) portion of the bandwidth because interference is less problematic on the UL portion of the bandwidth than on the downlink (DL) portion of the bandwidth. On the UL portion of the bandwidth, a transmitting D2D UE interferes with the reception of signals at the communications controller. Thus, when the transmitting D2D UE is a reasonable distance from the communications controller, the interference from the transmitting D2D UE has limited impact at the communications controller. Conversely, on the DL portion of the bandwidth, D2D interference from the transmitting D2D UE affects neighboring UEs. The neighboring UEs may have a reduced ability to receive synchronization channels and control channels, such as the PDCCH or ePDCCH, due to the interference. D2D transmissions on the downlink portion of the bandwidth have a greater impact to the system operation than D2D transmissions on the UL portion of the bandwidth.

In device-centric D2D mode, there may be many collisions because of the ad hoc nature of the transmissions. The transmitting UE does not sense the channel, but transmits a sidelink control information (SCI), which contains some scheduling information, and then the data.

In an embodiment, collisions are reduced in device-centric D2D mode by transmitting on resources which are statistically less likely to be occupied. In one example, the UE pseudo-randomly selects resources for D2D transmission without considering the collision history on resources of the resource data pool. Alternatively, the UE selects resources considering the collision history on resources of the resource pool.

An embodiment resource selection method for device-centric D2D mode has a sensing phase and a transmission phase. In the sensing phase, the transmitting UE measures the available D2D resources, such as resource blocks and/or subframes. Also in the sensing phase, the UE determines based on measurement metrics, such as energy, power, signal-to-noise ratio (SNR), or signal plus interference to noise ratio (SINR) on the resources, whether there is a nearby UE which is transmitting on that resource. When a nearby UE is transmitting on a particular resource, it is more likely that the nearby UE will continue to transmit on that resource in the future, which may lead to interference when the transmitting UE attempts to transmit D2D data or SCI on that resource. The measurement may be performed for a particular duration of time S, for example 25 ms, 50 ms, 100 ms, 200 ms, 250 ms, or a longer duration, or a time period equivalent, such as a particular number of subframes, to obtain average statistics on the resource pool. The transmitting UE determines that, on average, Z % of the resources is occupied. There may be a separate metric for each resource. The transmitting UE may sense the resources by observing the subframes on which SCI is transmitted, and determines which resources, such as subframes or resource blocks, carry transmitted data. Based on observing the assignments, the transmitting UE determines the occupancy of the resource.

In the transmission phase, based on the occupancy of the resources, the transmitting UE determines the fraction of time it will transmit D2D data. The fraction of time may represent the amount of available resources. For example, when Z is 0%, the transmitting UE transmits almost all the time (on almost all available resources) because the likelihood of a collision is very low. On the other hand, when Z is large (e.g., >75%), the UE rarely transmits because the likelihood of a collision is very high. The transmitting UE may defer transmission or use a small number of resources. When transmitting, the transmitting UE pseudo-randomly selects a D2D resource among the available resources. The transmitting UE may transmit data or scheduling assignments. Transmission on pseudo-random selected resources does not totally avoid contention, but reduces the probability of collisions by transmitting on the resources which are less crowded. The pseudo-random selection of resources exhibits statistical randomness, but which are generated by a deterministic causal process (e.g., procedure, function).

The sensing duration may be long, for example more than a subframe, such as 10, 25, 50, 100, 200, or more subframes. The sensing may depend on the configuration which has previously been obtained from the communications controller. For example a threshold may be used on the cell-specific reference signal (CRS) measurement. When the CRS measurement is less than X, device-centric D2D mode is used. On the other hand, when the CRS measurement is greater than or equal to X, device-centric D2D mode is not used. The UE may be pre-configured to enable sensing when the CRS measurement is greater than or equal to the threshold X, and to not perform sensing when the measurement is less than the threshold. The threshold may be pre-configured or configured by signaling from the communications controller, for example higher layer signaling, such as RRC signaling.

The UE may also obtain the resource pool from the communications controller. Information on the resource pool may be received on higher layer signaling, such as RRC signaling.

The duration of the sensing may depend on the resource pool size. For example, the sensing duration may be a non-decreasing function of the resource pool size or a non-increasing function of the resource pool size. In one example, the maximum sensing duration is M subframes and the size of the resource pool is N physical resource blocks, and the sensing duration is determined by the ceiling (M/N). The sensing duration may also be related to the overhead of the measurement process.

When a UE loses coverage, it may be pre-configured to search for the network for a period of time T before performing device-centric D2D communications. The sensing duration may be related to the period of time T. For example, the potentially transmitting UE may have a sensing duration of T, and may be sensing during that entire period of time.

The sensing window may be shifted as time passes.

Sensing may be performed on D2D data resources based on the data resource pool for D2D transmission. In one example, the sensing is performed over all of the resources in the data resource pool. Alternatively, the sensing is performed over a subset of resources of the data resource pool. The subset of resources may include multiple D2D transmission resource units, which may be D2D data or other D2D channels, a single D2D transmission resource unit, or a fraction of a D2D transmission resource unit having one or more physical resource blocks (PRBs).

In another example, the UE evaluates the SA resource pool and determines the average collision probability based on the SA resource pool. It may be desirable to ensure that the SCI is received reliably, which is transmitted in the SA resource pool, because the control information provides parameters about the data.

An occupancy parameter may indicate the occupancy of a resource. With respect to the occupancy parameter, the UE senses the resources and calculates the average occupancy probability of resources. Alternatively or additionally, the UE measures the average power for the sensing duration. The average occupancy probability of resources may be calculated for subframes having a received power greater than a pre-configured threshold. This may be especially useful when the UE chooses the number of retransmissions in a data resource pool.

Sensing parameters may be pre-configured, received from a communications controller, or determined based on other parameters. Sensing parameters include sensing thresholds for SINR, SNR, and/or energy, and the sensing duration. The sensing parameters may be determined based on other parameters, such as X, which may be received from a communications controller, for example on high level signaling, such as RRC.

In the transmission phase, the transmitting UE translates the collision statistics to a transmission probability. The average occupancy probability, Z, may be translated into a transmission probability Y. The transmission probability may be obtained based on a random back-off algorithm, such as an exponential algorithm or truncated exponential algorithm, where Y is the inverse of the back-off window size. Exponential backoff is an algorithm which uses feedback to multiplicatively decrease the rate of a process to gradually find an acceptable rate. Truncated exponential backoff, also known as binary exponential backoff, is an algorithm used to space out repeated retransmissions of the same block of data, for example to avoid network congestion. The average probability of a collision is used as the input to the exponential or truncated exponential algorithm. In one example, where the measured collision probability is Z, the transmission probability Y is:

$$Y = 2^{-w} \quad (1)$$

where $$w = f(Z) \quad (2)$$

An example of f(Z) is given by:

$$f(Z) = G(\log_2 \max(\alpha Z, 1)) \quad (3)$$

In one example, G(·) is a quantization function and α is a constant. The parameters of converting Z to Y may be pre-configured in the UE. In another example, the parameters of converting Z to Y are configured by the network, for example by higher layer signaling, such as a broadcast or dedicated RRC signaling.

The transmitting D2D UE also determines the number of retransmissions in the data pool. The transmitting D2D UE may select the number of retransmissions based on the collision statistics. For example, there may be more retransmission attempts when there is a collision on less crowded resources where there is a lower likelihood of collisions.

Figure 5:
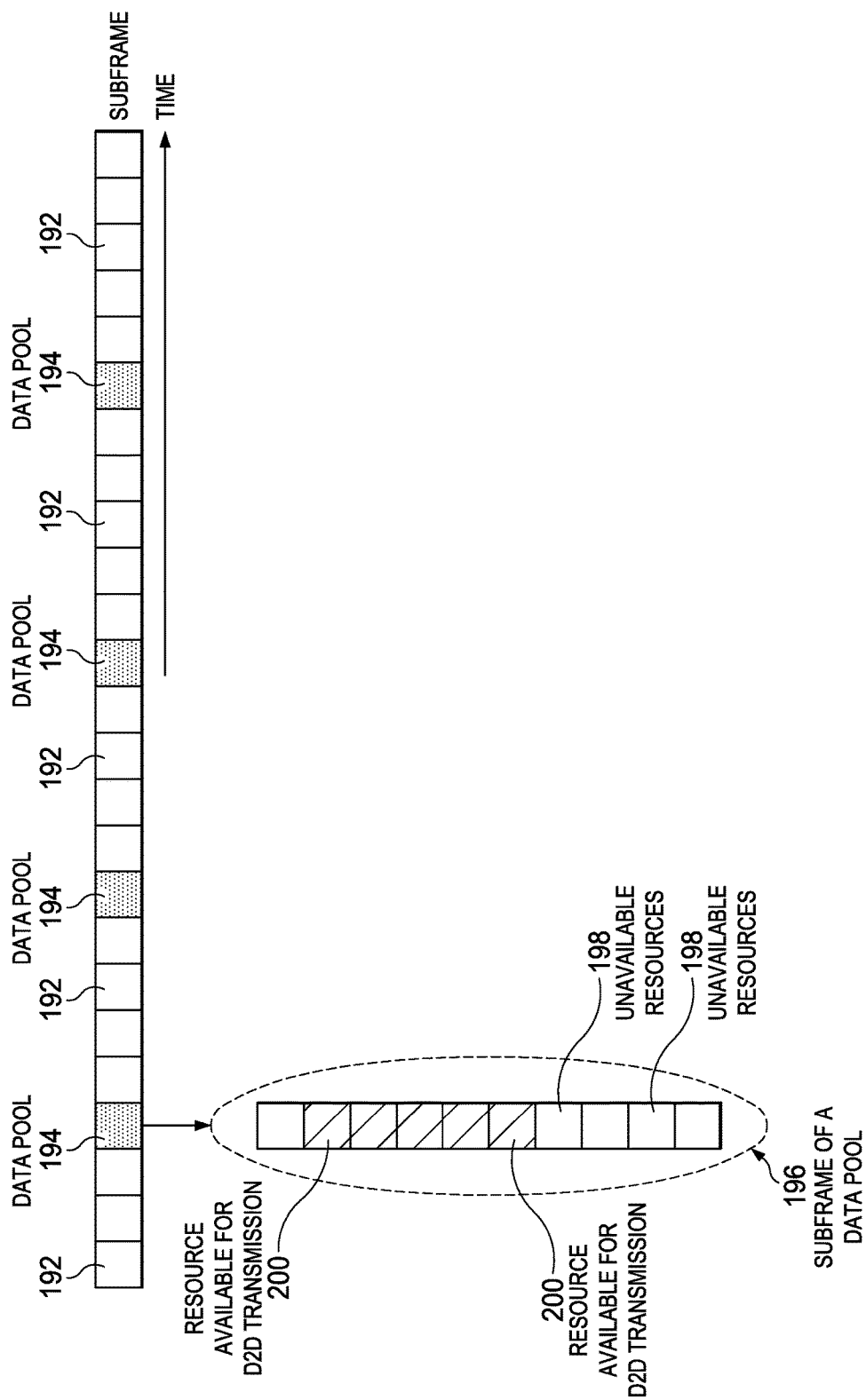
FIG. 5 illustrates examples of subframes and resources.

FIG. 5 illustrates an example sequence of subframes. Subframes 194 are subframes where resources are available for D2D transmission of data and/or SA, while subframes 192 are reserved for cellular communications. Subframe 196 shows a decomposition of an example available subframe. Resources 200 are available resource blocks for D2D transmission, while resources 198 are unavailable for D2D transmission. The resources may be PRB pairs or other resources. The energy per PRB may be calculated. The energy per PRB and the number of occupied PRBs may be used to determine the occupancy ratio probability.

Figure 6:
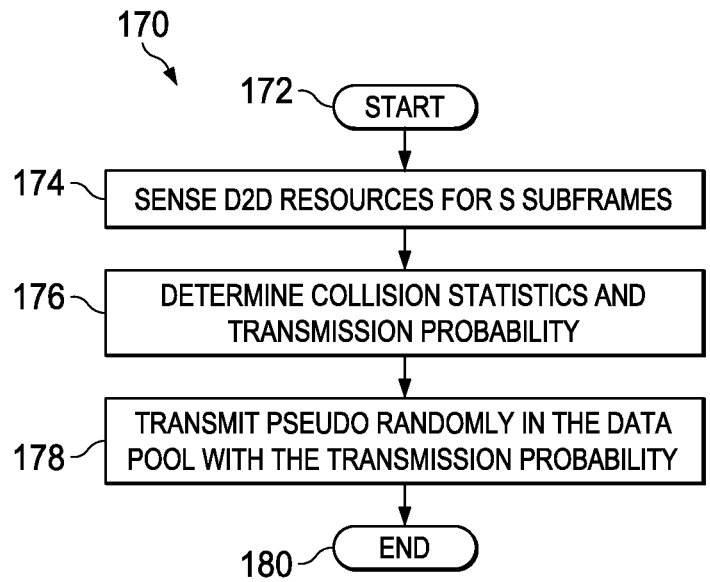
FIG. 6 illustrates a flowchart of an embodiment method of D2D communication performed by a user equipment (UE)

FIG. 6 illustrates flowchart 170 for a D2D communication method for the device-centric mode. The method is performed by a UE (the transmitting UE) which attempts to transmit data using device-centric mode with another UE. This method may be performed by multiple UEs attempting to transmit on D2D. Initially, in step 172, the method begins.

In step 174, the transmitting UE senses D2D resources. The sensing is performed over S subframes, or over a particular predetermined sensing duration, to obtain average statistics. The sensing duration may be long, for example from about 50 subframes to about 200 subframes. In one example, the sensing duration is set to be the amount of time the transmitting UE attempts to reconnect to the communications controller before performing D2D transmission. The sensing duration may depend on the size of the resource pool. For example, the sensing duration may be a non-decreasing function or a non-increasing function of the resource pool size. The resource pool may have previously been received from a communications controller. The energy, power, SNR, and/or SINR may be detected on resources of the resource pool, such as resource blocks and/or subframes. Some subframes are in the SA data pool for D2D transmission, while other subframes are not in the data pool. Within a subframe in the data pool, some resources are available for D2D transmission, and other resources are not available for D2D transmission.

Sensing may be performed on the data resource pool. In one example, sensing is performed over all of the D2D resources in the resource pool. In another example, sensing is performed over a subset of resources, for example multiple D2D transmission resource units, a single D2D transmission unit, or a fraction of a D2D transmission unit with at least one PRB. The transmitting UE may evaluate the SA resource pool. Average power may be sensed over the sensing duration. The sensing duration may be pre-determined, previously received from a communications controller, or determined based on a parameter received from a communications controller. The sensing duration may be received directly from a communications controller, for example on higher level signaling, or on a broadcast. In another example, a parameter X is received from the communications controller, and the sensing duration is determined based on X. Also, sensing thresholds may be received from a communications controller. The sensing thresholds may then be used in the sensing process. In other examples, the sensing thresholds are pre-determined, or sensing thresholds are not used.

Next, in step 176, collision statistics and transmission probabilities are determined based on the resources sensed in step 174. The UE determines that, on average, Z % of the resources is occupied. The average occupancy probability of resources is calculated based on the sensed resources. The UE translates the collision statistics to a transmission probability. The transmission probability may be determined using a random back-off algorithm, such as an exponential or truncated exponential algorithm. Y may be equal to the inverse of the back-off window size. The average probability of the collision is used as the input to the algorithm. In one example, the measured collision probability is Z, and the transmission probability is given by:

$$Y = 2^{-w} \quad (4)$$

where $$w = f(Z) \quad (5)$$

An example of f(Z) is given by:

$$f(Z) = G(\log_2 \max(\alpha Z, 1)) \quad (6)$$

where G(·) is a quantization function.

Then, in step 178, the transmitting UE transmits pseudo-randomly selected resources in the data resource pool based on the transmission probability. The portion of resources where the transmitting UE transmits may be inversely related to Z. For example, when Z is 0, the UE transmits on most of the resources, and when Z is large, the UE rarely transmits or transmits on a small number of resources. Also, the transmitting UE may determine the number of retransmissions in the data pool based on the collision statistics. The rate of retransmissions may be less when the transmission probability is low and the likelihood of a collision is high.

Finally, in step 180, D2D transmission is complete, and the method ends.

Figure 7:
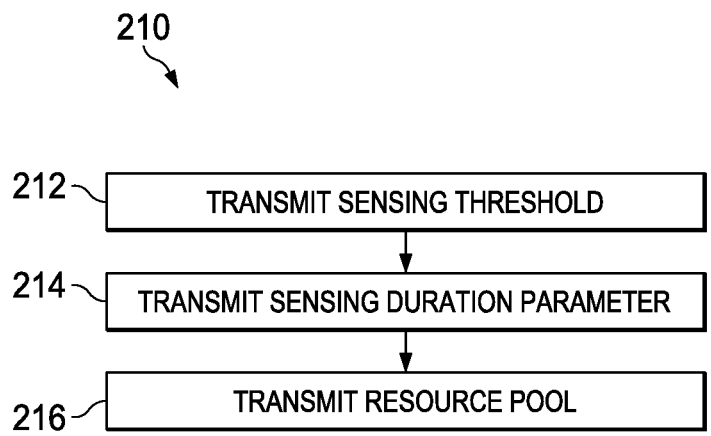
FIG. 7 illustrates a flowchart of an embodiment method of D2D communication performed by a communications controller.

A communications controller may transmit signal parameters to a UE, to facilitate the UE performing D2D communications in the device-centric mode. FIG. 7 illustrates flowchart 210 of a method of transmitting parameters from a communications controller to a UE. In step 212, the communications controller transmits a sensing threshold to the UE. The sensing threshold may be used by the UE in sensing the D2D resources. The sensing threshold may be for sensing energy, power, SINR, or SNR.

In step 214, the communications controller transmits a predetermined sensing duration parameter to the UE. In one example, the sensing duration itself is transmitted. In another example, a parameter X is transmitted, and the UE will determine the sensing parameter based on X.

In step 216, the communications controller transmits the resource pool to the UE.

Figure 8:
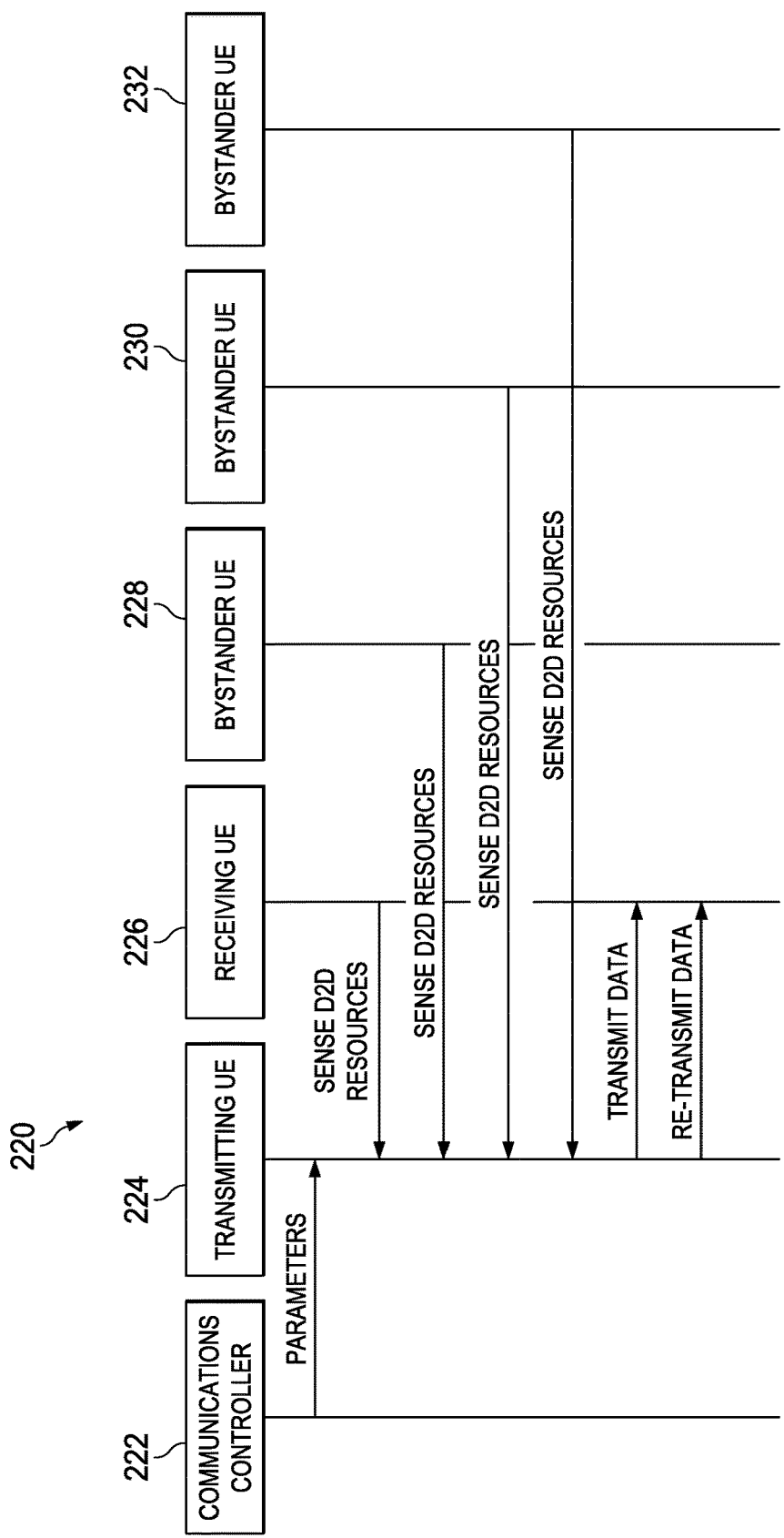
FIG. 8 illustrates an embodiment message diagram for D2D communication.

FIG. 8 illustrates a message diagram 220 for device-centric D2D communications. Transmitting UE 224, the transmitting UE, receives parameters from communications controller 222, which will be used in device-centric D2D communication. The transmitting UE may receive a sensing threshold, for example an energy threshold, power threshold, SNR threshold, or SINR threshold. Also, the transmitting UE may receive a sensing duration or a sensing duration parameter X from the communications controller. Additionally, the transmitting UE may receive a resource pool of resources which are available for D2D communication. The received parameters may later be used in D2D transmission.

Then, the transmitting UE senses D2D resources that other UEs, including receiving UE 226 and nearby UEs 228, 230, and 232 may transmit on. The UEs may serve different roles in different D2D transmissions. For example the nearby UEs may be transmitting UEs and/or receiving UEs in other D2D transmissions, and the transmitting UE and receiving UE may be nearby UEs for the other D2D transmissions. The transmitting UE senses the D2D resources for a predetermined sensing duration to determine average statistics. The sensing duration may be long, for example about 50 subframes to about 200 subframes. The duration of the sensing may depend on the size of the resource pool. For example, the sensing duration may be a non-decreasing function or a non-increasing function of the resource pool size. In one example, the sensing duration is related to a period of time the UE attempts to connect to a communications controller before performing D2D transmissions. The energy, power, SNR, and SINR may be detected on resources, such as resource blocks and/or subframes. Some subframes are in the SA data pool for D2D transmission, while other subframes are not in the data pool. Within a subframe in the data pool, some resources are available for D2D transmission, and other resources are not available for D2D transmission.

Sensing may be performed on D2D data resources in the data resource pool. In one example, the sensing is performed on all of the resources in the resource pool. Alternatively, sensing is performed over a subset of resources, for example multiple D2D transmission resource units, a single D2D transmission unit, or a fraction of a D2D transmission unit with at least one PRB. Average power may be sensed during the sensing duration. The sensing duration may be predetermined, previously been received from a communications controller, or determined based on a parameter received from a communications controller. The sensing duration may be received directly from a communications controller. In another example, a parameter X is received from the communications controller, and the sensing duration is determined based on X. Also, sensing thresholds may be received from a communications controller. The sensing thresholds may then be used in the sensing process. Additionally, the data pool may be received from a communications controller.

Next, collision statistics and transmission probabilities are determined based on the sensed resources. The transmitting UE determines that, on average, Z % of the resources is occupied. The average occupancy probability of resources is calculated based on the sensed resources. The transmitting UE translates the collision statistics to a transmission probability.

The transmitting UE 224 transmits data to receiving UE 226 using D2D resources. The data is transmitted on resources that are pseudo-randomly determined using the transmission probability. The portion of time for transmission may be inversely related to Z. For example, when Z is 0, the UE transmits on most of the resources, and when Z is large, the UE only occasionally transmits (transmits on a small subset of resources). In another example, scheduling assignments are transmitted on resources which are determined pseudo-randomly.

When the data transmission is not successful, the transmitting UE may re-transmit the data to the receiving UE. The retransmission may be based on the resource availability. The transmitting UE may be more likely to retransmit data when the transmission probability is high.

Figure 9:
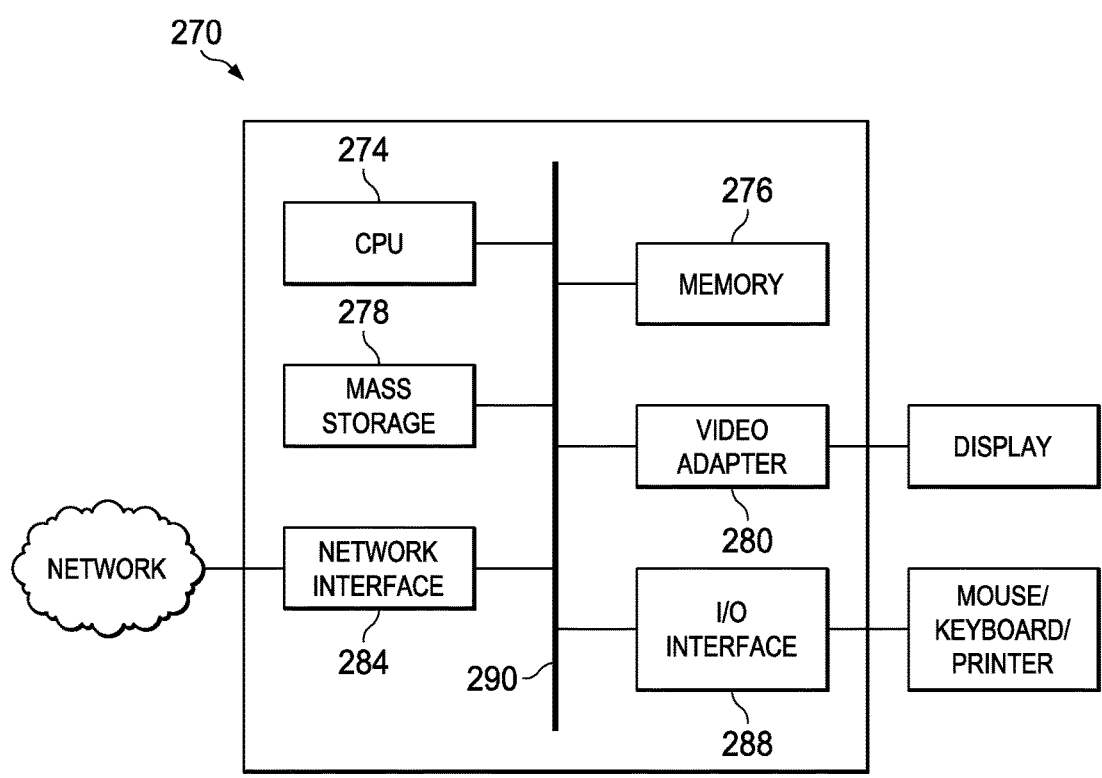
FIG. 9 illustrates a block diagram of an embodiment computer system.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 270 may be equipped with one or more input devices, such as a microphone, mouse, touchscreen, keypad, keyboard, and the like. Also, processing system 270 may be equipped with one or more output devices, such as a speaker, a printer, a display, and the like. The processing system 270 may include central processing unit (CPU) 274, memory 276, mass storage device 278, video adapter 280, and I/O interface 288 connected to a bus 290.

The bus 290 may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 276 may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adapter 280 and I/O interface 288 provide interfaces to couple external input and output devices to the processing system 270. As illustrated, examples of input and output devices include the display coupled to the video adapter 280 and the mouse/keyboard/printer coupled to the I/O interface 288. Other devices may be coupled to the processing system 270, and additional or fewer interface devices may be utilized. For example, a serial interface (not pictured) may be used to provide a serial interface for a printer.

The processing system 270 also includes one or more network interface 284, which may comprise wired links, such as an Ethernet cable or the like, and/or wireless links to access nodes or different networks. Network interface 284 allows the processing system 270 to communicate with remote units via the networks. For example, the network interface 284 may provide wireless communication via one or more transmitters/transmit antennas and one or more receivers/receive antennas. In an embodiment, the processing system 270 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for device-to-device (D2D) communication, the method comprising:
   measuring received powers on D2D resources of D2D subframes for a predetermined time duration, thereby generating measured received powers on the D2D resources of the D2D subframes, the D2D resources of the D2D subframes being selected from a pool of D2D resources;
   determining a resource occupancy ratio of the D2D resources during the predetermined time duration in accordance with a number of D2D resources having measured received powers above a predetermined threshold;
   determining a fraction of transmission time to be used for a D2D transmission over available D2D resources in accordance with the resource occupancy ratio, the fraction of transmission time corresponding to a first set of D2D subframes; and
   transmitting, by a first user equipment (UE) to a second UE, data over some subframes of the first set of D2D subframes.

2. The method of claim 1, further comprising determining the resource occupancy ratio in accordance with a collision rate.

3. The method of claim 1, wherein the pool of D2D resources comprises subframes from a scheduling assignment pool.

4. The method of claim 1, further comprising determining a transmission probability in accordance with the resource occupancy ratio, wherein the first set of D2D subframes are determined randomly in accordance with the transmission probability.

5. The method of claim 4, wherein determining the transmission probability comprises determining the transmission probability in accordance with a frequency resource occupancy.

6. The method of claim 1, further comprising sensing a signal-to-noise (SNR) ratio or a signal plus interference to noise (SINR) ratio.

7. The method of claim 1, wherein determining the resource occupancy ratio comprises determining an occupancy parameter.

8. The method of claim 1, further comprising determining an average power on the D2D resources of the D2D subframes.

9. The method of claim 1, further comprising sensing D2D subframes when the measured received powers on the D2D resources of the D2D subframes are greater than a threshold.

10. The method of claim 1, further comprising receiving, by the first UE from a communications controller, the predetermined time duration.

11. The method of claim 1, further comprising determining the predetermined time duration in accordance with a size of a pool of subframes.

12. The method of claim 1, further comprising retransmitting, by the first UE to the second UE, the data over a second set of D2D subframes in accordance with the resource occupancy ratio.

13. The method of claim 1, further comprising receiving, by the first UE from a communications controller, the pool of D2D resources.

14. The method of claim 1, wherein the predetermined time duration is 100 millisecond.

15. The method of claim 11, wherein the predetermined time duration is a non-decreasing function of the size of the pool of subframes.

16. The method of claim 4, wherein determining the transmission probability comprises determining the transmission probability in accordance with a random back-off algorithm.

17. A first user equipment (UE) comprising:
    a processor; and
    a non-transitory computer readable storage medium storing programming for execution by the processor, the programming including instructions configuring the first UE to:
    measure received powers on D2D resources of D2D subframes for a predetermined time duration, thereby producing measured received powers on the D2D resources of the D2D subframes, the D2D resources of the D2D subframes being selected from a pool of D2D resources, determine a resource occupancy ratio of the D2D resources of the D2D subframes during the predetermined time duration in accordance with the measured received powers on the D2D resources that are above a predetermined threshold, determine a fraction of transmission time to be used for a D2D transmission over available D2D resources in accordance with the resource occupancy ratio, the fraction of transmission time corresponding to a set of D2D subframes, and transmit, to a second UE, data over some subframes of the set of D2D subframes.

18. The first UE of claim 17, wherein the instructions further comprise instructions configuring the first UE to determine a transmission probability in accordance with the resource occupancy ratio, and to select the set of D2D subframes randomly in accordance with the transmission probability.

19. The first UE of claim 17, wherein the instructions further comprise instructions to sense a signal-to-noise (SNR) ratio or a signal plus interference to noise (SINR) ratio.

20. A computer program product comprising a non-transitory computer readable storage medium storing programming for execution on a processor, the programming including instructions for:

measuring received powers on D2D resources of D2D subframes for a predetermined time duration, thereby producing measured received powers on the D2D resources of the D2D subframes;

determining a resource occupancy ratio of the D2D resources during the predetermined time duration in accordance with a number of D2D resources having measured received powers above a predetermined threshold;

determining a fraction of transmission time to be used for a D2D transmission over available D2D resources in accordance with the resource occupancy ratio, the fraction of transmission time corresponding to a set of D2D subframes; and instructing to transmit, from a first user equipment (UE) to a second UE, data over some subframes of the set of D2D subframes.

* * * * *